UNITED STATES PATENT OFFICE.

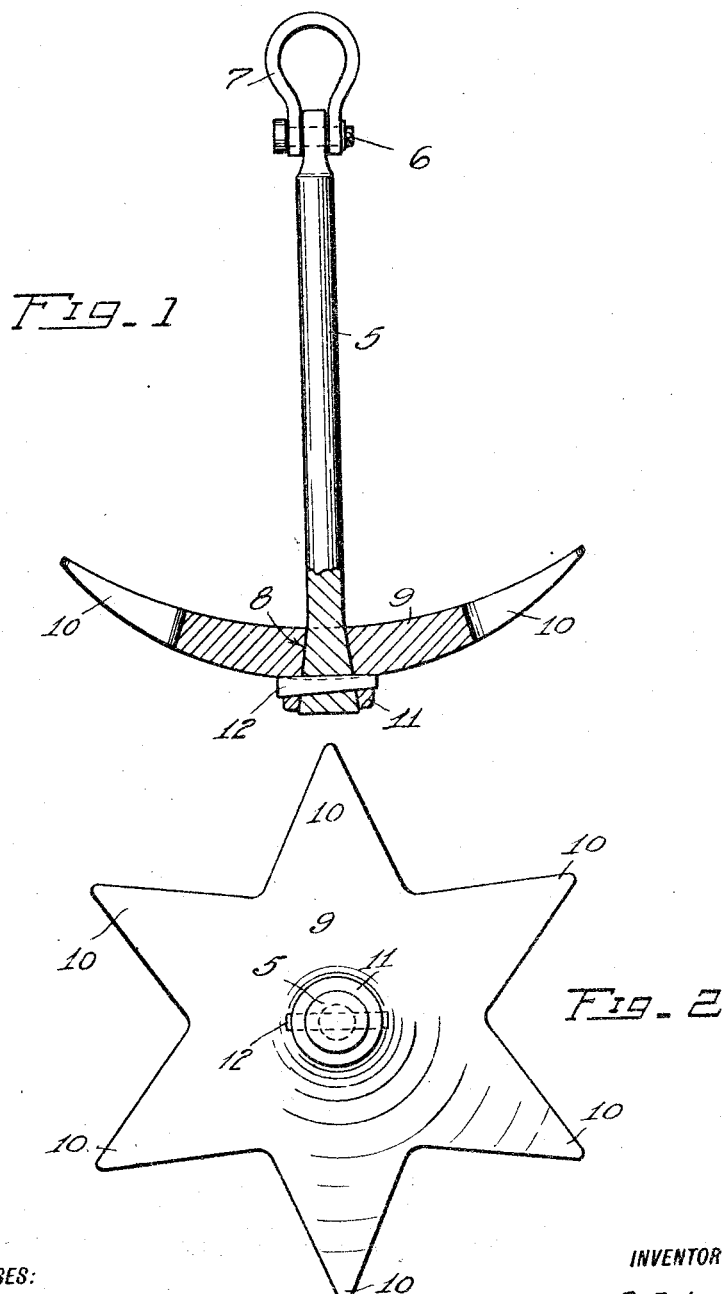

ELIAS W. JOHNSTON, OF SEATTLE, WASHINGTON.

ANCHOR.

1,051,334.  Specification of Letters Patent.  Patented Jan. 21, 1913.

Application filed April 8, 1912. Serial No. 689,327.

*To all whom it may concern:*

Be it known that I, ELIAS W. JOHNSTON, a citizen of the United States, residing at Seattle, in the county of King and State of Washington, have invented certain new and useful Improvements in Anchors, of which the following is a specification.

This invention relates to anchors and, while capable of various applications, is peculiarly adapted for use with anchor-buoys or for other permanent moorings.

The object of the invention is to provide a simple, strong, and inexpensive anchor capable of penetrating the ground and retaining its hold therein under any required service. This object I attain in the construction hereinafter fully described and which is illustrated in the accompanying drawings, in which—

Figure 1 is a vertical elevation, partly in section, of an anchor embodying my invention; and Fig. 2 is an underside plan view of the same.

The reference numeral 5 designates the anchor-shank provided at one end with an eye through which is passed a pin 6 for securing a shackle link 7. The other end of the shank is made conical or flaring, as at 8, to fit within a correspondingly shaped recess provided within the anchor-head 9. This head is of substantially bowl-shape and is serrated about its periphery to afford substantially triangular flukes 10. Extending downwardly from the convex or underside of the head is a hub 11 to furnish a greater amount of bearing surface for said shank and also to provide space for a locking key 12 which is driven into registering apertures provided in the shank and the hub.

The anchor head, constituted of the bowl having a notched circumference and the hub, is formed integral and may advantageously be constructed of cast iron.

The anchor-head is constructed to have its inner and outer faces converge from the center portion of the head toward the ends of the flukes, whereby the same present approximately wedge-shaped projections. The advantages of this construction will be apparent inasmuch as an anchor will more readily embed itself in the ground with a wedging action and thus serve to perform the services of an ordinary ship's anchor as well as holding with the efficiency of the so-called mushroom anchors.

What I claim as my invention, is—

An anchor comprising a head of concavo convex form with radially-extending flukes, and a hub formed centrally of and projecting beyond the convex face of the head, said hub and head having an aperture therethrough conical throughout its length and the hub having a lateral aperture intersecting said conical aperture, the lateral aperture having a straight wall and an opposite inclined wall, a shank having an enlarged conical end fitting in the conical aperture of the head and hub, and a key extending through the apertures in the hub and through a similarly shaped aperture in the shank.

Signed at Seattle, Wash., this 28th day of March, 1912.

ELIAS W. JOHNSTON.

Witnesses:
  HORACE BARNES,
  E. PETERSON.